United States Patent
Zhang et al.

(10) Patent No.: US 9,083,494 B2
(45) Date of Patent: Jul. 14, 2015

(54) EFFICIENT RESOURCE UTILIZATION IN TDD

(75) Inventors: Xiaoxia Zhang, San Diego, CA (US); Durga Prasad Malladi, San Diego, CA (US); Yongbin Wei, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 740 days.

(21) Appl. No.: 13/069,312

(22) Filed: Mar. 22, 2011

(65) Prior Publication Data

US 2011/0235555 A1 Sep. 29, 2011

Related U.S. Application Data

(60) Provisional application No. 61/316,689, filed on Mar. 23, 2010.

(51) Int. Cl.
*H04W 72/00* (2009.01)
*H04L 5/00* (2006.01)
*H04W 72/04* (2009.01)

(52) U.S. Cl.
CPC ............ *H04L 5/0053* (2013.01); *H04L 5/0007* (2013.01); *H04L 5/0048* (2013.01); *H04W 72/04* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 5,838,668 | A * | 11/1998 | Okada et al. | 370/312 |
| 6,839,565 | B2 * | 1/2005 | Sarkkinen et al. | 455/503 |
| 2006/0129692 | A1 * | 6/2006 | Lassen et al. | 709/230 |
| 2008/0137597 | A1 * | 6/2008 | Lu | 370/329 |
| 2008/0232323 | A1 * | 9/2008 | Jeong et al. | 370/331 |
| 2009/0040976 | A1 * | 2/2009 | Kim et al. | 370/329 |
| 2009/0073922 | A1 | 3/2009 | Malladi et al. | |
| 2009/0265599 | A1 * | 10/2009 | Chae et al. | 714/749 |
| 2009/0313515 | A1 | 12/2009 | Barve | |
| 2010/0039997 | A1 | 2/2010 | Ratasuk et al. | |
| 2010/0165882 | A1 * | 7/2010 | Palanki et al. | 370/254 |
| 2010/0260136 | A1 * | 10/2010 | Fan et al. | 370/330 |
| 2010/0265870 | A1 | 10/2010 | Cai et al. | |
| 2010/0284364 | A1 * | 11/2010 | You et al. | 370/330 |
| 2011/0110296 | A1 * | 5/2011 | Malladi et al. | 370/328 |
| 2011/0141952 | A1 * | 6/2011 | Wang et al. | 370/294 |
| 2012/0320823 | A1 * | 12/2012 | Ohta et al. | 370/315 |

FOREIGN PATENT DOCUMENTS

WO WO2008127015 10/2008
WO WO2009110821 A1 9/2009

OTHER PUBLICATIONS

International Search Report and Written Opinion—PCT/US2011/029670, ISA/EPO—Jul. 7, 2011.
(Continued)

*Primary Examiner* — Hassan Kizou
*Assistant Examiner* — Roberta A Shand

(57) ABSTRACT

In a wireless communication system unused resource elements are utilized to transmit additional pilot and control signals. The additional pilot and control signals may mitigate the impact of interference. The unused resource elements may be in a downlink pilot timeslot (DwPTS) in a time division duplex system.

32 Claims, 8 Drawing Sheets

(56) References Cited

OTHER PUBLICATIONS

Patrick Hosein: "Resource Allocation for the LTE Physical Downlink Control Channel", GLOBECOM Workshops, 2009,IEEE, IEEE, Piscataway, NJ, USA, Nov. 30, 2009, pp. 1-5, XP031585752, ISBN: 978-1-4244-5626-0.

Qualcomm Europe: "Multicarrier Control for LTE-Advanced", 3GPP Draft; RI-090359, 3rd Generation Patrnership Project (3GPP), Mobile Competence Centre ; 650, Route des Lucioles ; F-06921 Sophia-Antipolis Cedex ; France, No. Ljubljana; Jan. 8, 2009, XP050318265, [retrieved on Jan. 8, 2009].

Rapeepat Ratasuk et al., "TDD design for UMTS Long-Term Evolution", Personal Indoor and Mobile Radio Communications, 2008. PIMRC 2008. IEEE 19th International Symposium on, IEEE, Piscataway, NJ, USA, Sep. 15, 2008, pp. 1-5, XP031371512, ISBN: 978-1-4244-2643.0.

* cited by examiner

EFFICIENT RESOURCE UTILIZATION IN TDD

CROSS REFERENCE TO RELATED APPLICATIONS

This application claims the benefit of U.S. provisional patent application No. 61/316,689 filed Mar. 23, 2010, in the names of ZHANG et al., the disclosure of which is expressly incorporated herein by reference in its entirety.

BACKGROUND

1. Field

Certain aspects of the present disclosure generally relate to wireless communications and more particularly, to systems and methods for efficient resource utilization in time division duplex.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method for wireless communications is offered. The method includes identifying resource elements not used in a subframe. The method also includes utilizing the unused resource elements to transmit at least one of additional pilot signals and control signals.

An apparatus for wireless communication is offered. The apparatus includes means for identifying resource elements not used in a subframe. The apparatus also includes means for utilizing the unused resource elements to transmit at least one of additional pilot signals and control signals.

A computer program product configured for wireless communications in a wireless network is offered. The computer program product includes a computer-readable medium having program code recorded thereon. The program code includes program code to identify resource elements not used in a subframe. The program code also includes program code to utilize the unused resource elements to transmit at least one of additional pilot signals and control signals.

An apparatus configured for wireless communication is offered. The apparatus includes a memory and at least one processor(s) coupled to the memory. The processor(s) is configured to identify resource elements not used in a subframe. The processor(s) is also configured to utilize the unused resource elements to transmit at least one of additional pilot signals and control signals.

A method for wireless communications is offered. The method includes receiving additional pilot signals and/or control signals on downlink resource elements previously identified by an eNodeB as being available in a subframe.

An apparatus configured for wireless communication is offered. The apparatus includes a memory, and at least one processor coupled to the memory. The processor(s) is configured to receive additional pilot signals and/or control signals on downlink resource elements previously identified by an eNodeB as being available in a subframe.

A computer program product configured for wireless communications in a wireless network is offered. The computer program product includes a computer-readable medium having program code recorded thereon. The program code includes program code to receive additional pilot signals and/or control signals on downlink resource elements previously identified by an eNodeB as being available in a subframe.

An apparatus for wireless communications is offered. The apparatus has means for receiving additional pilot signals and/or control signals on downlink resource elements previously identified by an eNodeB as being available in a subframe. The apparatus also has means for decoding the additional pilot signals and/or control signals.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Low Chip Rate (LCR), Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described for LTE or LTE-A (together referred to in the alternative as "LTE/-A") and use such LTE/-A terminology in much of the description below.

Figure 1:
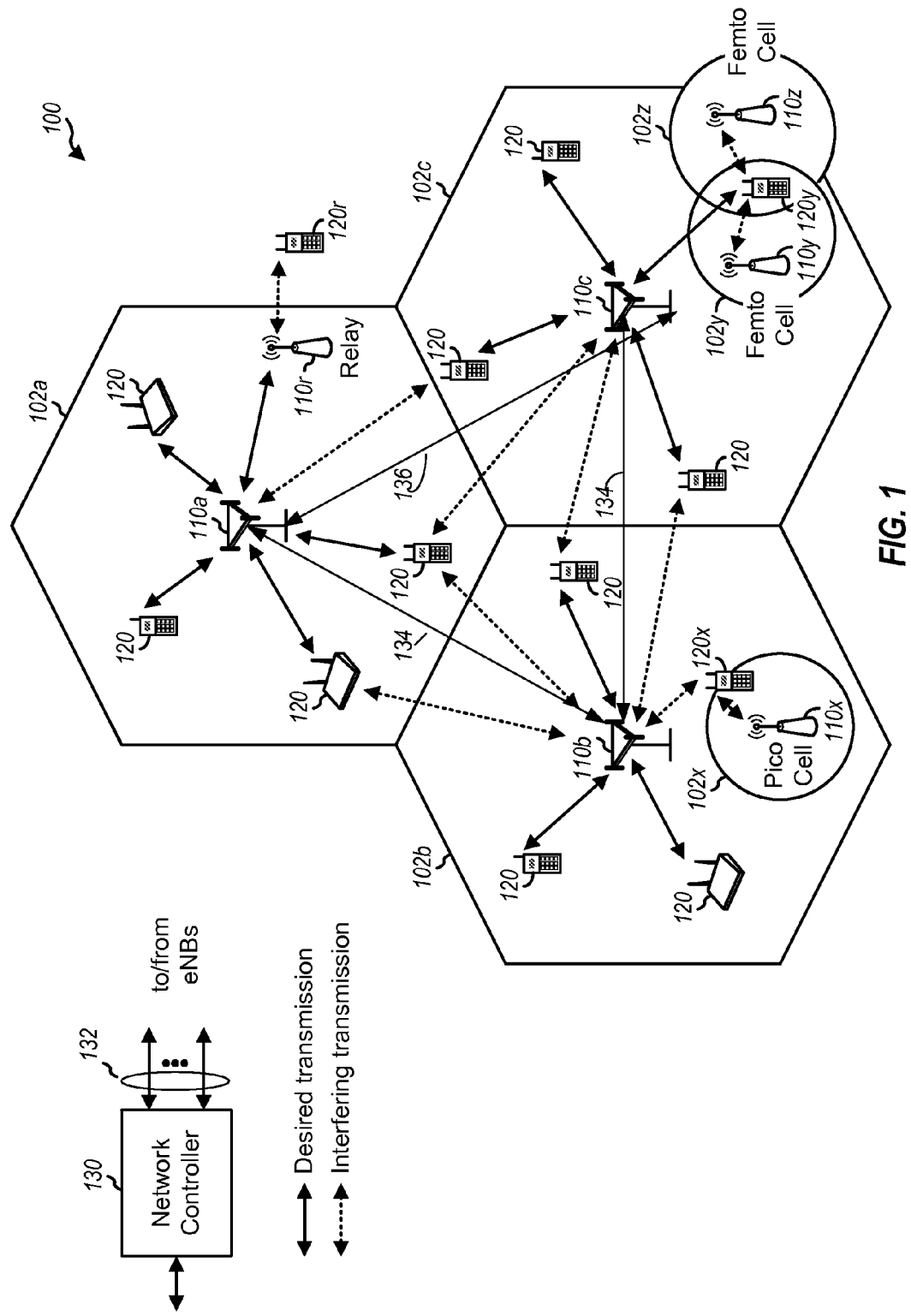
FIG. 1 is a block diagram conceptually illustrating an example of a mobile communication system.

FIG. 1 shows a wireless communication network 100, which may be an LTE/-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 also includes relay stations. A relay station is a station that receives a transmission of data and/or other information from an upstream station (e.g., an eNodeB, a UE, or the like) and sends a transmission of the data and/or other information to a downstream station (e.g., another UE, another eNodeB, or the like). A relay station may also be a UE that relays transmissions for other UEs. In the example shown in FIG. 1, a relay station 110r may communicate with the eNodeB 110a and a UE 120r, in which the relay station 110r acts as a relay between the two network elements (the eNodeB 110a and the UE 120r) in order to facilitate communication between them. A relay station may also be referred to as a relay eNodeB, a relay, and the like.

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB. According to an aspect of the present disclosure, a UE 120 communicating with a base station 110a hands over to a base station 110b without the base station 110a first preparing the base station 110b for the handover. Such a handover will be referred to as a "forward handover." The network shown in FIG. 1 may employ efficient resource utilization according to the aspects of the present disclosure.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the smallest resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
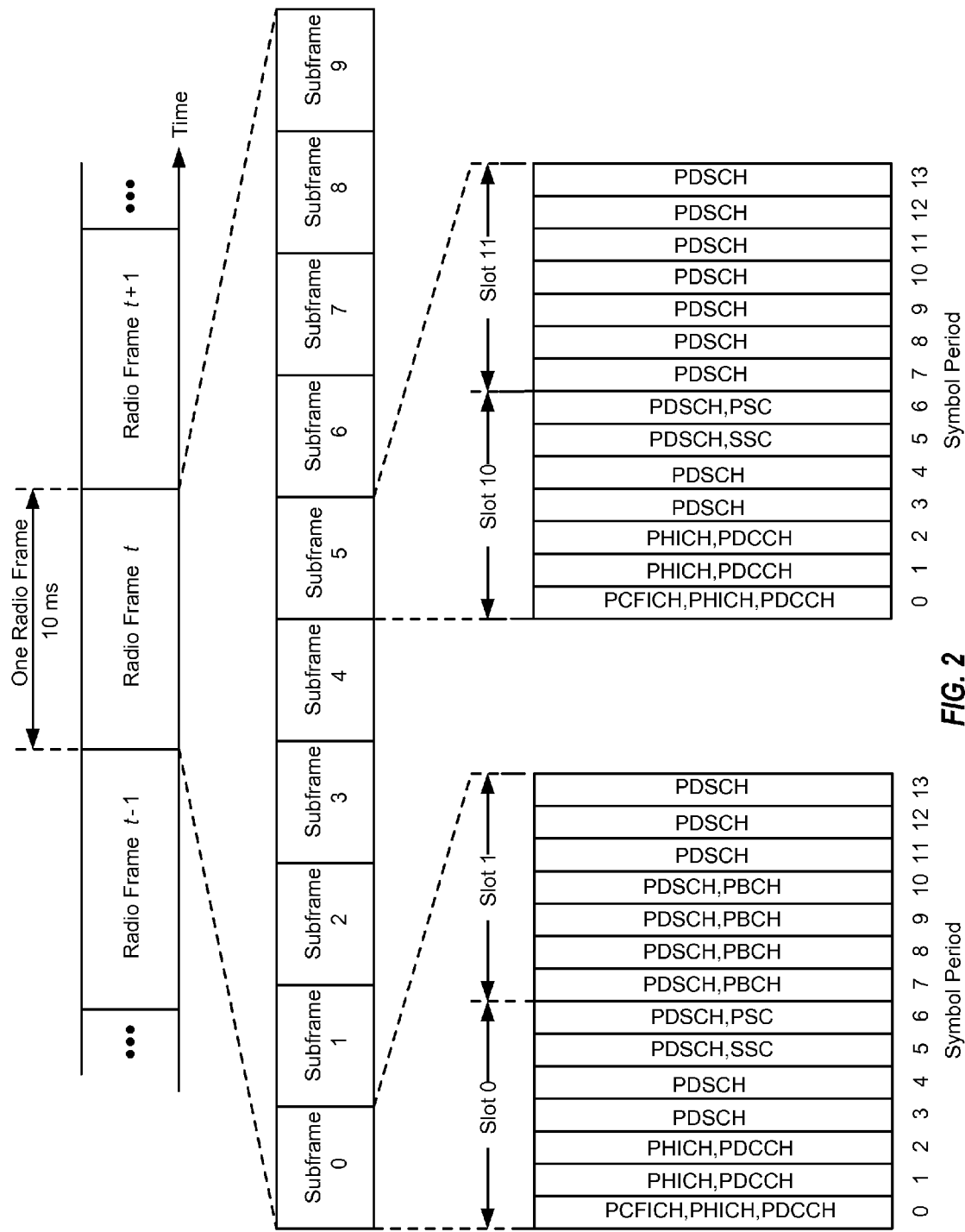
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot. The frame structure shown in FIG. 2 may employ efficient resource utilization according to the aspects of the present disclosure.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
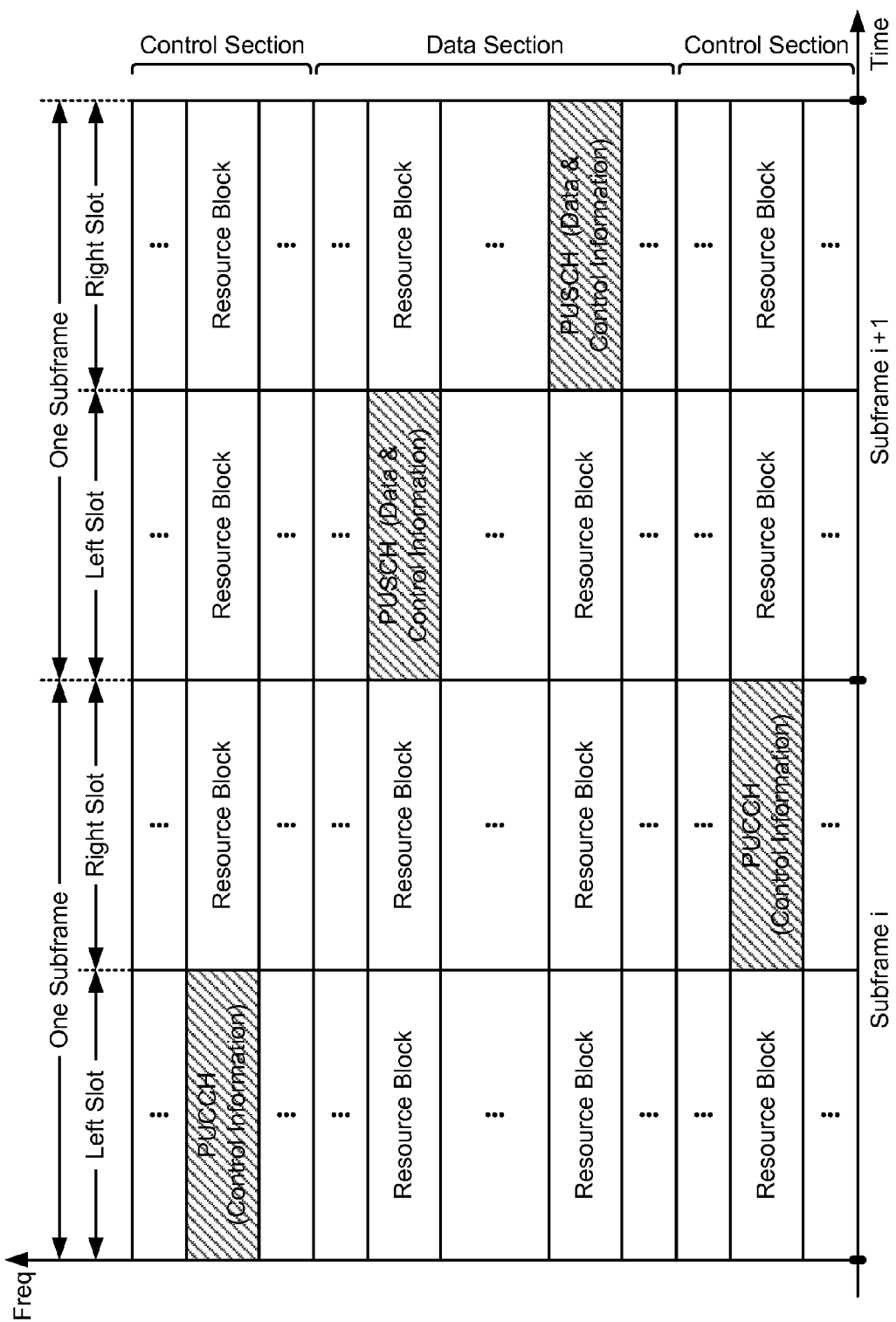
FIG. 3 is a block diagram conceptually illustrating an exemplary frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section. The subframe structure shown in FIG. 3 may employ efficient resource utilization according to the aspects of the present disclosure.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
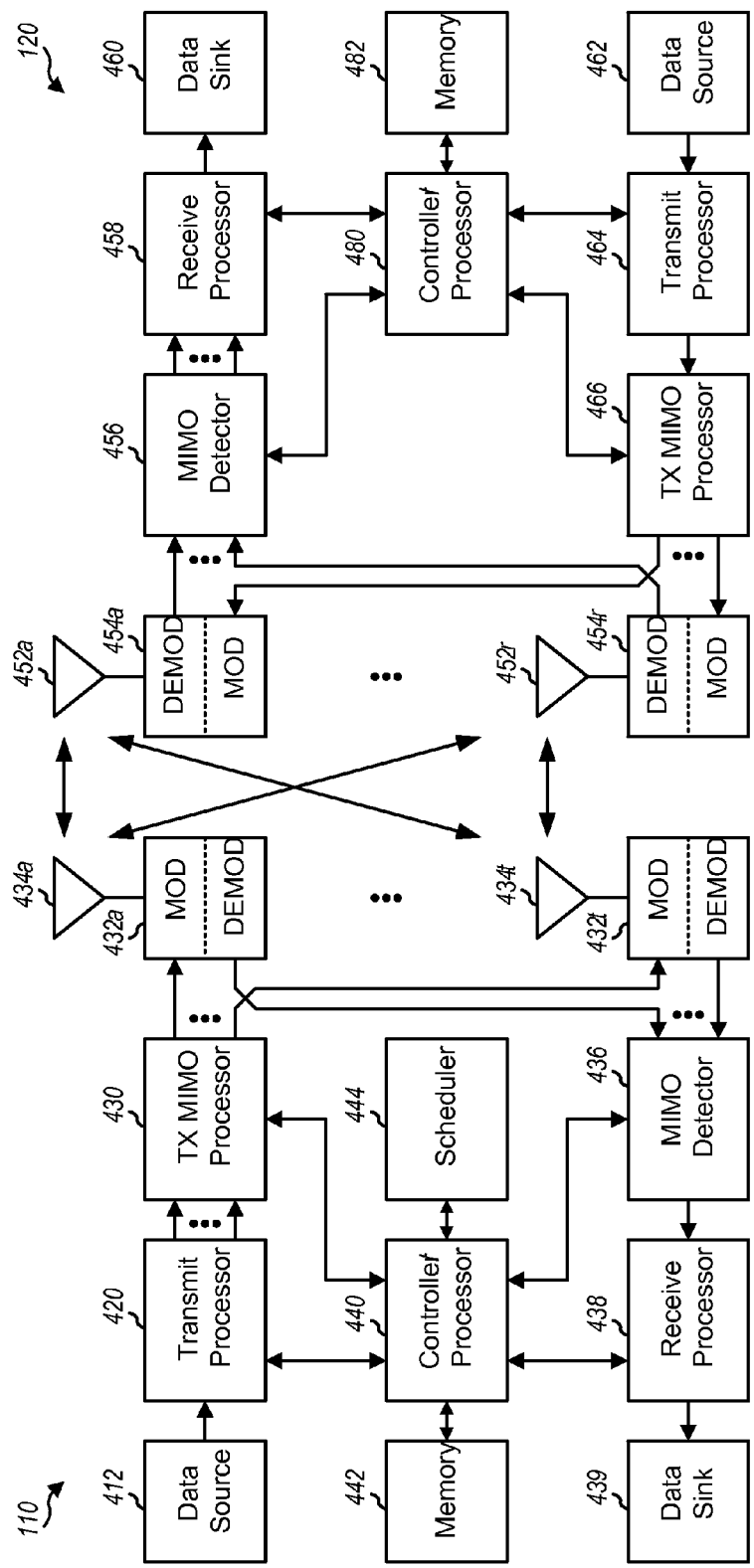
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The eNodeB and UE structures shown in FIG. 4 may employ efficient resource utilization according to the aspects of the present disclosure. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The base station 110 can send forward handover control messages to other base stations, for example, over an X2 interface.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of processes for the techniques described herein. The memories 442 and 482 may store data and program codes for the base station 110 and the UE 120, respectively. A scheduler 444 may schedule UEs for data transmission on the downlink and/or uplink.

Efficient Resource Utilization

Certain aspects of the present disclosure define methods for efficiently utilizing resources in time division duplex (TDD) systems. The proposed methods utilize the unused resources to transmit additional pilot and control signals to mitigate interference in the system.

In TDD systems, due to the hybrid automatic repeat request (HARQ) timeline, some downlink (DL) subframes may only contain DL assignments while some other subframes may only contain uplink (UL) assignments and acknowledgements.

Figure 5:
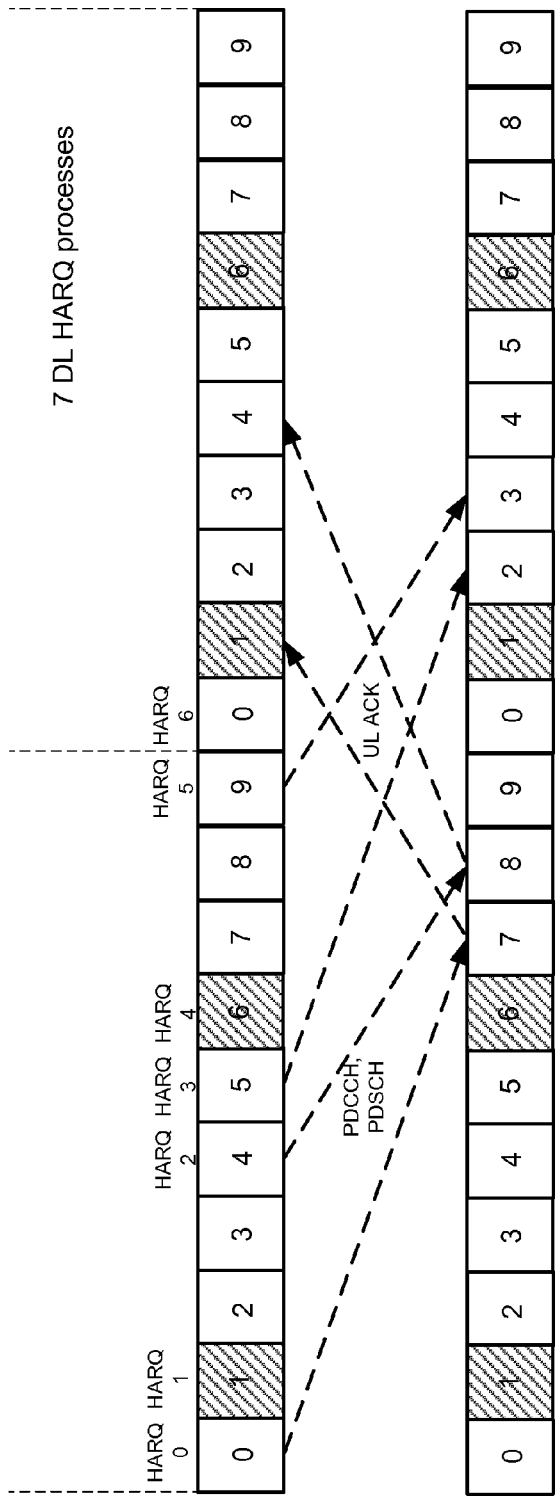
FIG. 5 illustrates an example downlink HARQ timeline for UL-DL configuration 1 and special subframe configuration 5, according to the long term evolution (LTE) standard.

FIG. 5 illustrates an example downlink HARQ timeline for uplink-downlink configuration 1 and special subframe configuration 5, according to the long term evolution (LTE) standard. Subframes 0, 4, 5, and 9 may include PDCCH and PDSCH transmissions. The PDCCH transmissions of subframes 0, 4, 5, and 9 include downlink assignments but do not include uplink assignments because in the depicted configuration, more downlink subframes exist than uplink subframes.

Special subframes (1 and 6) are designated with shading. Each special subframe includes a downlink pilot time slot (DwPTS). Note that subframes 1 and 6 do not have any downlink grant or physical downlink shared channel (PDSCH) transmissions, for example, when a downlink pilot time slot (DwPTS) configuration contains three symbols or less. Each TDD uplink/downlink configuration informs a UE of the uplink and downlink subframes split within a radio frame. Depending on the location of the uplink subframes, some downlink subframes may or may not have corresponding uplink grant and/or uplink acknowledgement messages. For example, as shown in FIG. 6, for special subframe configuration 1, subframes 0 and 5 do not send any uplink grant or PHICH while subframes 1 and 6 do not send any downlink assignment or PDSCH.

Figure 6:
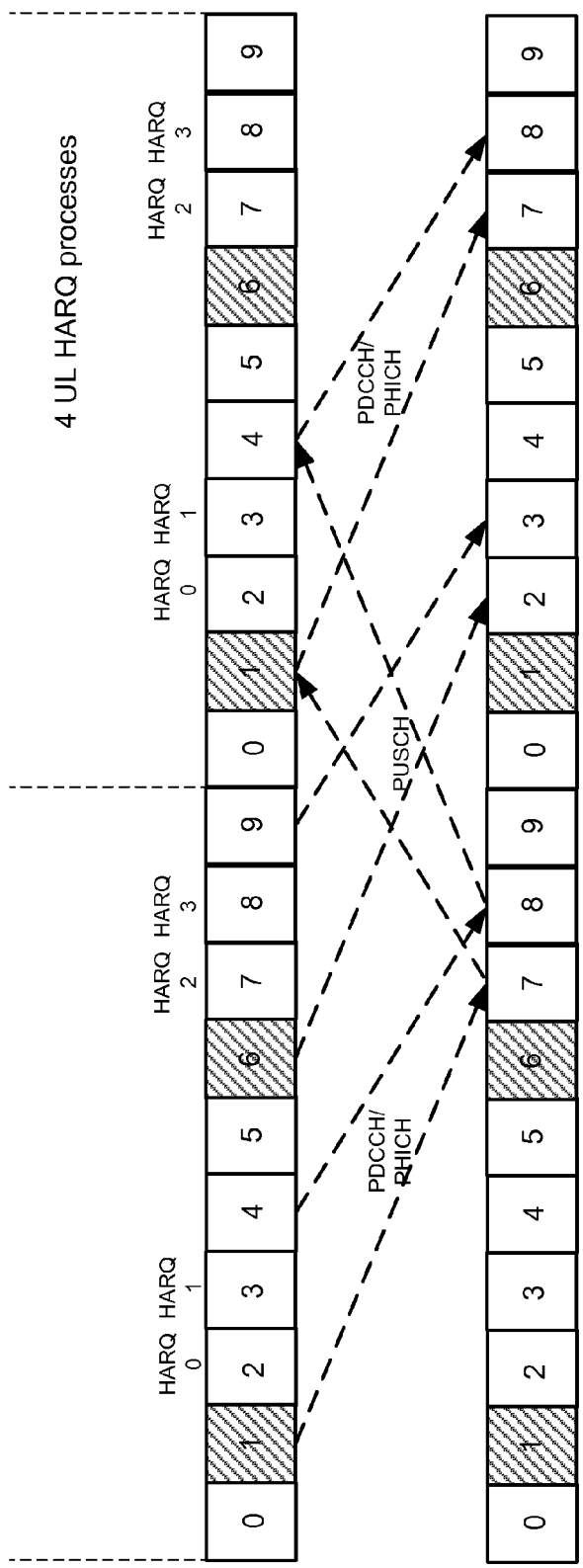
FIG. 6 illustrates an example UL HARQ timeline, according to the LTE standard.

In the uplink, a similar HARQ timeline as illustrated in FIG. 6 may apply. FIG. 6 illustrates an example uplink HARQ timeline, according to the LTE standard. As illustrated, subframes 0 and 5 do not send any uplink grant or acknowledgement messages.

It should be noted that the behavior illustrated in FIGS. 5 and 6 may apply to uplink-downlink configurations in which there are more downlink subframes than uplink subframes. Certain downlink subframes may contain only downlink assignments and others may contain only uplink assignments. Therefore, extra PDCCH space may exist in the downlink subframes.

As noted above, when the DwPTS has a length equal to three symbols, no PDSCH is sent. Thus, unused resource elements (REs) are present in the DwPTS. PDCCH transmissions in the DwPTS may span only one or two symbols, therefore, the third symbol in the DwPTS may only contain a primary synchronization signal (PSS) in the center six resource blocks (RBs) while the rest of the resource elements (REs) are left empty.

For certain aspects, the extra PDCCH space in downlink subframes may be used for cross subframe and/or cross carrier signaling in heterogeneous networks. PDCCH transmissions may be used for signaling for the other downlink subframes where the UE experiences strong interference.

For certain aspects, the extra PDCCH space in downlink subframes may be used for large aggregation sizes for PDCCH to reduce the interference impact in heterogeneous networks. Thus, a PDCCH may be transmitted on multiple tones, with more tones at a higher aggregation level resulting in a more robust protection from interference. For example, an aggregation level of 1 means the 36 tones are used to transmit a single PDCCH, an aggregation level of 2 means the 72 tones are used, an aggregation level of 4 means 144 tones are used, and an aggregation level of 8 means 288 tones are used. To better handle interference, a transmission of PDCCH may take a larger aggregation size by spanning more CCEs. That is, for example, by allowing a PDCCH to span 72 tones rather than 36 tones, with some tones potentially suffering from interference, the PDCCH may be more resistant to interference.

For certain aspects, weak cells such as macro cells in heterogeneous networks may use large aggregation sizes while strong interfering cells such as femto cells may use normal aggregation sizes.

For certain aspects, the unused resource elements in the DwPTS may be used for noise estimation in the receiver processing or may be used to transmit additional pilots (for example, common reference signal (CRS) or channel state information reference signal (CSI-RS)). Weak cells may send additional CRSs using the empty resource elements while strong cells may send CRSs according to Rel-8 of the LTE standard.

For certain aspects, the unused resource elements in the DwPTS may be used for additional PCFICH/PHICH/PDCCH transmissions. For example, weak cells may send additional PCFICH/PHICH/PDCCH signals using the empty resource elements in addition to the PCFICH/PHICH/PDCCH transmissions based on Rel-8 of the LTE standard, while strong cells simply send Rel-8 PCFICH/PHICH/PDCCH transmissions in the first one or two symbols to reduce interference in heterogeneous networks. However, there may be a desire to modify control channel element (CCE) definition such that the new PCFICH/PHICH/PDCCH uses a primary synchronization signal (PSS) symbol. Locations of CCEs are determined based on section 36.211 of the LTE standard. In one aspect, CCEs may be moved or grouped together to free up blocks of contiguous tones for other purposes.

For certain aspects, additional symbols may be created in the DwPTS. For example, when the DwPTS spans more than three symbols, PSS symbols may be used for PDSCH transmissions and there may not be any unused resource elements. To create additional resource elements, the eNB may prevent scheduling PDSCH transmissions in the DwPTS. Hence, the PSS symbol and the symbols onwards in the DwPTS may be used for the additional pilot and/or control signaling to mitigate the interference.

For certain aspects, an eNB may also advertise a DwPTS length which is smaller than the actual DwPTS length to create additional unused resource elements to be used for sending additional pilot and/or control signals. For example, instead of advertising n symbols in the DwPTS, the eNBs may advertise n-x symbols in the DwPTS. The eNBs may use the x symbols for additional usage/signaling such as noise estimation, CSI-RS, cross-subframe/cross-carrier signaling and so on. The value of x may be a function, e.g., a deterministic function, of system frame number (SFN) and cell ID or it may be signaled to the nodes semi-statically. If semi-static signaling is to occur, the value x may be read from the system information block.

In addition, there may also be a desire to modify the CCE definition such that new PCFICH/PHICH/PDCCH transmission starts from the PSS symbol or onwards.

Figure 7:
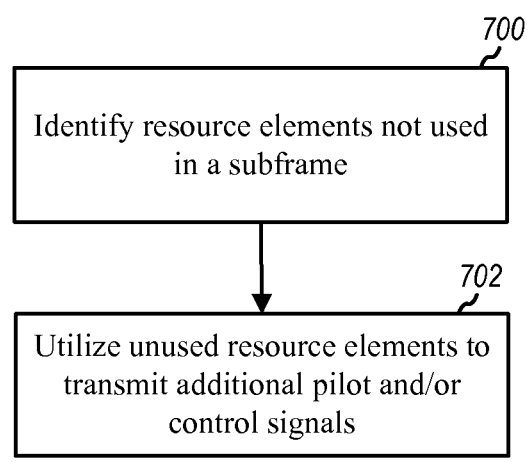
FIG. 7 is an illustration of efficient resource utilization according to one aspect of the present disclosure.

FIG. 7 illustrates efficient utilization of resources according to one aspect of the present disclosure. At block 700, resource elements that are not used in a subframe are identified. At block 702, the unused resource elements are utilized to transmit additional pilot and/or control signals.

Figure 8:
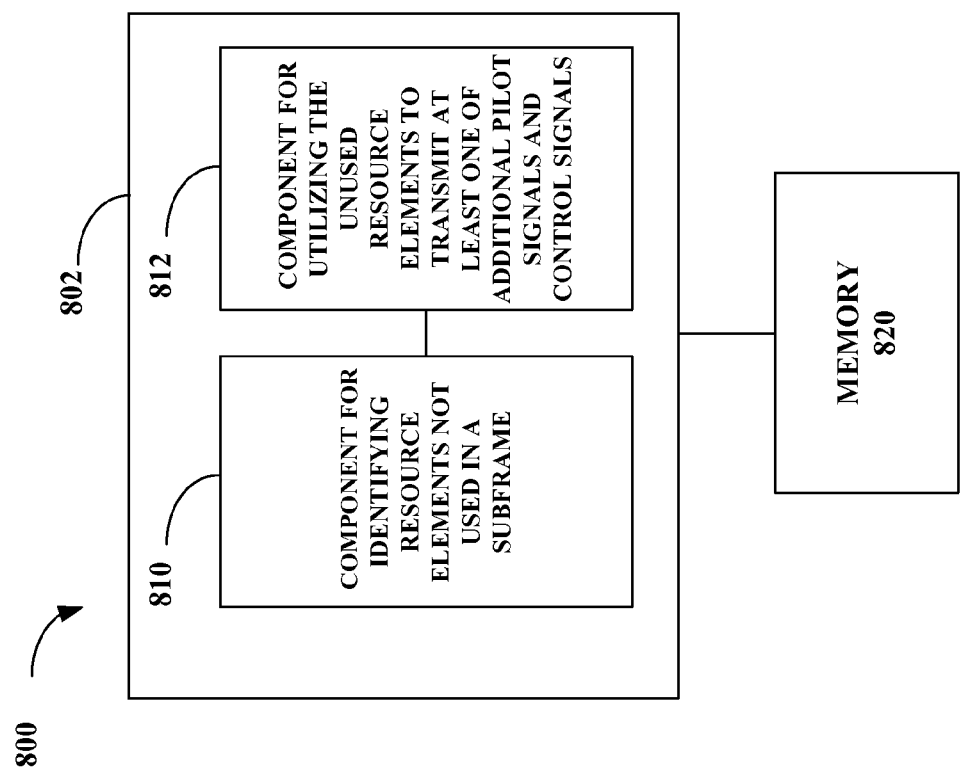
FIG. 8 illustrates a system that facilitates efficient resource utilization according to one aspect of the present disclosure.

FIG. 8 illustrates a system 800 that facilitates efficient resource utilization according to one aspect of the present disclosure. System 800 may reside within a base station, for instance. System 800 includes functional blocks that can represent functions implemented by a processor, software, or combination thereof (e.g., firmware), wherein system 800 includes a logical grouping 802 of electrical components that can act in conjunction. As illustrated, logical grouping 802 can include a component, e.g., an electrical component, for identifying resource elements not used in a subframe 810, as well as a component, e.g., an electrical component, for utilizing the unused resource elements to transmit at least one of additional pilot signals and control signals 812. Additionally, system 800 can include a memory 820 that retains instructions for executing functions associated with components 810 and 812, wherein any of components 810 and 812 may exist either within or outside memory 820.

Aspects of the present disclosure propose methods for efficiently utilizing unused resources in a time division duplex system. The unused resources may be used for additional pilot and/or control signals which may help mitigate effects of interference.

According to one aspect of the present invention, an apparatus includes means for identifying one or more downlink resource elements that are not used in a subframe and means for utilizing the unused resource elements to transmit at least one of additional pilot and control signals. In one aspect, the aforementioned means may be the controller/processor 440, the transmit processor 420, and/or the scheduler 444. In another aspect, the aforementioned means may be a module or any apparatus configured to perform the functions of the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   determining a hybrid automatic repeat request (HARQ) timeline;
   identifying downlink resource elements in a downlink pilot timeslot (DwPTS), based at least in part on a HARQ configuration of the HARQ timeline, the identified downlink resource elements being allocated for HARQ communications according to the HARQ configuration but remaining unused for HARQ communications during a subframe; and
   utilizing the unused resource elements to transmit, by a base station, at least one of pilot signals and control signals during the subframe.

2. The method of claim 1, in which the identified resource elements are in physical downlink control channel (PDCCH) symbols in the DwPTS.

3. The method of claim 2, further comprising:
   utilizing the identified resource elements to increase a size of aggregation for a physical downlink control channel to mitigate an impact of interference.

4. The method of claim 2, further comprising:
utilizing the identified resource elements to send information for another carrier.

5. The method of claim 2, further comprising:
utilizing the identified resource elements to send information for another subframe.

6. The method of claim 1, in which the identified resource elements are utilized for noise estimation in receiver processing.

7. The method of claim 1, in which the identified resource elements are utilized by one or more weak cells for additional transmissions in at least one of: a physical control format indicator channel, a physical hybrid automatic repeat request indicator channel, and a physical downlink control channel.

8. The method of claim 1, further comprising:
creating at least one identified resource element by not scheduling physical downlink shared channel transmissions in a downlink pilot timeslot.

9. The method of claim 1, further comprising:
creating at least one identified resource element by advertising fewer symbols in the downlink pilot timeslot.

10. The method of claim 9 in which the advertising occurs semi-statically in a system information block (SIB).

11. The method of claim 9 in which the advertising is based on a deterministic function of at least one of a system frame number (SFN) and a cell identification number.

12. An apparatus for wireless communication, the apparatus comprising:
means for determining a hybrid automatic repeat request (HARQ) timeline;
means for identifying downlink resource elements in a downlink pilot timeslot (DwPTS), based at least in part on a HARQ configuration of the HARQ timeline, the identified downlink resource elements being allocated for HARQ communications according to the HARQ configuration but remaining unused for HARQ communications during a subframe; and
means for utilizing the unused resource elements to transmit, by a base station, at least one of pilot signals and control signals during the subframe.

13. A computer program product configured for wireless communications in a wireless network, the computer program product comprising:
a non-transitory computer-readable medium having program code recorded thereon, the program code comprising:
program code to determine a hybrid automatic repeat request (HARQ) timeline;
program code to identify downlink resource elements in a downlink pilot timeslot (DwPTS), based at least in part on a HARQ configuration of the HARQ timeline, the identified downlink resource elements being allocated for HARQ communications according to the HARQ configuration but remaining unused for HARQ communications during a subframe; and
program code to utilize the unused resource elements to transmit, by a base station, at least one of pilot signals and control signals during the subframe.

14. An apparatus configured for wireless communication, the apparatus comprising:
a memory; and
at least one processor coupled to the memory and configured:
to determine a hybrid automatic repeat request (HARQ) timeline;
to identify downlink resource elements in a downlink pilot timeslot (DwPTS), based at least in part on a HARQ configuration of the HARQ timeline, the identified downlink resource elements being allocated for HARQ communications according to the HARQ configuration but remaining unused for HARQ communications during a subframe; and
to utilize the unused resource elements to transmit, by a base station, at least one of pilot signals and control signals during the subframe.

15. The apparatus of claim 14, in which the identified resource elements are in physical downlink control channel (PDCCH) symbols in the DwPTS.

16. The apparatus of claim 15, in which the at least one processor is further configured:
to utilize the identified resource elements to increase a size of aggregation for a physical downlink control channel to mitigate an impact of interference.

17. The apparatus of claim 15, in which the at least one processor is further configured:
to utilize the identified resource elements to send information for another carrier.

18. The apparatus of claim 15, in which the at least one processor is further configured:
to utilize the identified resource elements to send information for another subframe.

19. The apparatus of claim 14, in which the identified resource elements are utilized for noise estimation in receiver processing.

20. The apparatus of claim 14, in which the identified resource elements are utilized by one or more weak cells for additional transmissions in at least one of: a physical control format indicator channel, a physical hybrid automatic repeat request indicator channel, and a physical downlink control channel.

21. The apparatus of claim 14, in which the at least one processor is further configured:
to create at least one identified resource element by not scheduling physical downlink shared channel transmissions in a downlink pilot timeslot.

22. The apparatus of claim 14, in which the at least one processor is further configured:
to create at least one identified resource element by advertising fewer symbols in the downlink pilot timeslot.

23. The apparatus of claim 22 in which the advertising occurs semi-statically in a system information block (SIB).

24. The apparatus of claim 22 in which the advertising is based on a deterministic function of at least one of a system frame number (SFN) and a cell identification number.

25. A method for wireless communications, comprising:
receiving, by a user equipment, at least one of pilot signals and control signals on downlink resource elements in a downlink pilot timeslot (DwPTS), the downlink resource elements being allocated for hybrid automatic repeat request (HARQ) communications and having been previously identified by an eNodeB as being available in a subframe due to no scheduled HARQ communications during the subframe according to a HARQ timeline.

26. The method of claim 25, in which the downlink resource elements are in physical downlink control channel (PDCCH) symbols in the DwPTS.

27. An apparatus configured for wireless communication, the apparatus comprising:
a memory; and
at least one processor coupled to the memory and configured:
to receive, by a user equipment, at least one of pilot signals and control signals on downlink resource elements in a downlink pilot timeslot (DwPTS), the downlink resource elements being allocated for hybrid automatic repeat request (HARQ) communications and having been previously identified by an eNodeB as being available in a subframe due to no scheduled HARQ communications during the subframe according to a HARQ timeline.

28. The apparatus of claim 27, in which the downlink resource elements are in physical downlink control channel (PDCCH) symbols in the DwPTS.

29. A computer program product configured for wireless communications in a wireless network, the computer program product comprising:
   a non-transitory computer-readable medium having program code recorded thereon, the program code comprising:
      program code to receive, by a user equipment, at least one of pilot signals and control signals on downlink resource elements in a downlink pilot timeslot (DwPTS), the downlink resource elements being allocated for hybrid automatic repeat request (HARQ) communications and having been previously identified by an eNodeB as being available in a subframe due to no scheduled HARQ communications during the subframe according to a HARQ timeline.

30. The non-transitory computer program product of claim 29, in which the downlink resource elements are in physical downlink control channel (PDCCH) symbols in the DwPTS.

31. An apparatus for wireless communications, comprising:
   means for receiving, by a user equipment, at least one of pilot signals and control signals on downlink resource elements in a downlink pilot timeslot (DwPTS), the downlink resource elements being allocated for hybrid automatic repeat request (HARQ) communications and having been previously identified by an eNodeB as being available in a subframe due to no scheduled HARQ communications during the subframe according to a HARQ timeline; and
   means for decoding the at least one of pilot signals and control signals.

32. The apparatus of claim 31, in which the downlink resource elements are in physical downlink control channel (PDCCH) symbols in the DwPTS.

* * * * *